(12) United States Patent
Liebst

(10) Patent No.: US 6,863,312 B1
(45) Date of Patent: Mar. 8, 2005

(54) PIPE CONNECTOR ASSEMBLY

(76) Inventor: Mark K. Liebst, 297 S. Pershing, Wichita, KS (US) 67218

( * ) Notice: Subject to any disclaimer, the term of this patent is extended or adjusted under 35 U.S.C. 154(b) by 0 days.

(21) Appl. No.: 10/677,695

(22) Filed: Oct. 2, 2003

(51) Int. Cl.$^7$ .......................... F16L 33/20; F16L 21/06
(52) U.S. Cl. .......................... 285/23; 285/404; 285/90; 285/236; 23/703.2
(58) Field of Search .......................... 285/23, 404, 90, 285/91, 419, 373, 236, 328; 24/703.2, 279

(56) References Cited

U.S. PATENT DOCUMENTS

| | | | |
|---|---|---|---|
| 2,292,310 A | | 8/1942 | Wilkins |
| 3,116,078 A | * | 12/1963 | Scherer ...................... 285/104 |
| 3,223,439 A | * | 12/1965 | Stevens ...................... 285/373 |
| 3,407,449 A | * | 10/1968 | Tetzlaff et al. ................. 24/19 |
| 3,564,676 A | * | 2/1971 | Oeser .......................... 24/279 |
| 3,566,982 A | | 3/1971 | Share et al. |
| 3,586,354 A | * | 6/1971 | Boscacci .................... 285/369 |
| 3,885,818 A | * | 5/1975 | Ammann ..................... 285/31 |
| 3,924,877 A | | 12/1975 | Leopold, Jr., et al. |
| 3,999,825 A | | 12/1976 | Cannon |
| 4,039,210 A | | 8/1977 | Wood et al. |
| 4,076,283 A | * | 2/1978 | Harrison ..................... 285/230 |
| 4,518,177 A | * | 5/1985 | Deakins ....................... 285/64 |
| 4,659,870 A | | 4/1987 | Jones |
| 4,819,974 A | | 4/1989 | Zeidler |
| 4,842,306 A | * | 6/1989 | Zeidler et al. .............. 285/104 |
| 4,991,879 A | * | 2/1991 | Miller ........................ 285/236 |
| 5,178,421 A | * | 1/1993 | Tressler ....................... 285/23 |
| 5,275,443 A | | 1/1994 | Klinger |
| 5,415,435 A | * | 5/1995 | Colbert ........................ 285/23 |
| 5,722,702 A | | 3/1998 | Washburn |
| 5,899,506 A | * | 5/1999 | Tseeng ................... 285/148.23 |
| 6,302,450 B1 | | 10/2001 | Dole |
| 6,343,772 B1 | | 2/2002 | Oi |
| 6,398,270 B1 | | 6/2002 | Fukui et al. |
| 6,568,430 B1 | | 5/2003 | Shafer |
| 2002/0033604 A1 | | 3/2002 | Minemyer |

* cited by examiner

Primary Examiner—Eric K. Nicholson
(74) Attorney, Agent, or Firm—Kenneth H. Jack; David Jack, LLC

(57) ABSTRACT

A pipe connector consisting of a sphincteral band having an over-center buckle; a coupling sleeve extending through the sphincteral band, the coupling sleeve having a wall and having a plurality of traction pin apertures extending through the wall; and a plurality of traction pins fixedly attached to the sphincteral band and extending inwardly from the sphincteral band, each traction pin extending through one of the traction pin apertures, each traction pin being moveable between an inwardly extended pipe engaging position and an outwardly retracted pipe disengaging position.

17 Claims, 6 Drawing Sheets

PIPE CONNECTOR ASSEMBLY

FIELD OF THE INVENTION

This invention relates to pipe fittings, pipe joints, and pipe couplings. More particularly, this invention relates to mechanical apparatus and assemblies adapted for interconnecting fluid bearing pipes.

BACKGROUND OF THE INVENTION

A drawback or deficiency of commonly known pipe connecting assemblies is that many undesirably form permanent pipe couplings or attachments. For example, copper water pipe systems which include pipe joints fused with solder typically are not disassembleable without cutting or breaking of pipe joints. Similarly, adhesively bonded polyvinylchloride plastic pipe systems are not disassembleable without breaking or cutting of pipes. Another drawback or deficiency of commonly known pipe joining systems is hazards inherent in installation and assembly of pipes. For example, copper piping systems are commonly assembled within tight wall spaces which include surrounding flammable wooden structures. Torch soldering of copper pipe joints within such spaces undesirably creates a hazard of an uncontrolled fire. Mechanical connectors for joining pipes are known; however, such connectors are typically mechanically complex and are not economically manufactured and sold. For example, threaded pipe joining systems require use of mechanically complex and expensive pipe threading and tapping machinery.

The instant inventive pipe connector substantially overcomes the above drawbacks and deficiencies by providing pipe joining structures and elements which are mechanically simple and which are economically manufactured and sold, such structures and elements comprising a simple apertured sleeve and a simple sphincteral band which supports and inwardly extends pipe engaging traction pins.

BRIEF SUMMARY OF THE INVENTION

A first structural component of the instant inventive pipe connector comprises a hollow bored coupling sleeve or quill having an inside diameter closely fitted for receiving the outside diameters of pipes to be joined by the pipe connector. To facilitate in-line pipe connections, the opposed longitudinal openings of the coupling sleeve preferably lie within parallel planes, each opening being angled at zero degrees with respect to the other opening. To facilitate angled pipe connections, the coupling sleeve may be elbowed, causing opposing openings of the coupling sleeve to be oriented with respect to each other at angles such as ninety degrees, forty-five degrees, or thirty degrees. Also suitably, the coupling sleeve may include a triple of openings for serving as a "T" joint connection or for serving as a "Y" joint. The coupling sleeve element of the instant invention may also advantageously incorporate openings having varying inside diameters for joining pipes of differing gauges having varying outside diameters. An end of the coupling sleeve element may also be advantageously molded as a part of or formed wholly with a pipe segment, leaving the opposite end of the coupling sleeve open for receipt of a second pipe segment.

A preferred material to be utilized in fabrication of the coupling sleeve element of the instant invention is economically fabricated injection molded polyvinylchloride plastic. Suitably, the coupling sleeve element may alternately be fabricated from stainless steel, brass, or copper.

Where, for example, the coupling sleeve element of the instant invention forms an "L" or elbow for joining pipes at a right angle, such sleeve preferably presents a pair of annular walls whose openings are angled at ninety degrees with respect to each other. Each of such annular walls necessarily has at least a first, and preferably a plurality of traction pin receiving apertures extending therethrough, such apertures preferably being evenly spaced, and arranged annularly about the annular walls. Preferably, each annular wall of such ninety degree coupling sleeve has three or more traction pin receiving apertures.

Regardless of the angular configuration of the coupling sleeve of the instant invention, such sleeve is preferably molded to integrally include fluid sealing means. Preferably, the fluid sealing means comprises annular "O" ring receiving channels which open inwardly and extend radially outward from the inner surfaces of the walls of the coupling sleeve. Suitably, the fluid sealing means may alternately comprise annular shelves or ridges for seating of elastomeric fluid sealing washers.

A second structural component of the instant inventive pipe connector comprises a sphincteral or contractible band through which the annular walls of the coupling sleeve extend. Where the coupling sleeve is formed wholly with an end of a pipe, a single sphincteral band may be suitably provided. Where the coupling sleeve serves as a "T" or "Y" connector, having three annular walls, three sphincteral bands are preferably provided. In all cases where the coupling sleeve forms an angled elbow, the walls of the coupling sleeve preferably extend through a pair of sphincteral bands. The sphincteral bands of the instant invention are necessarily capable of contracting from an outwardly extended or expanded orientation wherein their inside diameters are slightly greater than the outside diameters of the walls of the coupling sleeve to inwardly contracted orientations wherein the sphincteral bands rest against the outer surfaces of said walls. Preferably, the sphincteral bands comprise flexible spring steel straps whose ends are interconnected by an over-center buckle. Suitably, the sphincteral bands may alternately comprise worm gear buckles, flexible pawl buckles, double eye turn back buckles, roll back fasteners, bandit band fasteners, cable tie fasteners, or preformed clamp fasteners.

A third structural component of the instant inventive pipe connector comprises at least first and preferably pluralities of cantilevered traction pins whose proximal ends are fixedly attached to the sphincteral bands and whose distal ends extend inwardly from the sphincteral bands. Necessarily, the traction pins are oriented and positioned upon the sphincteral bands so that they inwardly extend through the traction pin apertures of the walls of the coupling sleeve for frictional contact with the outer surfaces of pipes which extend into the coupling sleeve. Upon sphincteral inward contraction of the sphincteral bands, the traction pins are driven inwardly for frictional engagements with underlying pipes, and upon release or outward expansion of the sphincteral bands, the traction pins outwardly retract, disengaging from and releasing underlying pipes. The distal or inner ends of the traction pins preferably are configured as spike points. Alternately, such ends may be suitably configured as laterally extending blade or knife edges, or as serrated or multiply toothed surfaces. Where the instant invention is intended to resist large pulling forces without pipe decoupling the distal ends of the traction pins are preferably configured to include blades or multiple teeth.

In operation of the instant invention, and assuming for the sake of example that the coupling sleeve is configured as a ninety degree "L", and also assuming that the connector's pair of sphincteral bands comprise over-center buckles, each of the over-center buckles are initially manipulated to outwardly expand or loosen their sphincteral bands. Thereafter, assuming that such coupling sleeve includes "O" ring receiving channels, "O" rings are inserted into the opposing openings of the coupling sleeve, and the "O" rings are seated within such channels. Thereafter, pipes to be joined by the inventive connector are manually driven longitudinally into the opposing openings of the coupling sleeve until such pipes both underlie traction pin apertures and are compressively received by the "O" rings. Preferably, the inserted ends of such joined pipes are chamfered or beveled for preventing rolling of "O" rings out of their channels as the ends of pipes are driven over the "O" rings. Thereafter, the operator manually closes the over-center buckles to tighten each sphincteral band about the coupling sleeve. Upon such tightening, the traction pins of each sphincteral band are driven inwardly through the traction pin apertures and into and against the underlying pipes. Thus configured, the traction pins resist longitudinal movements of the joined pipes within the coupling sleeve, utilizing the walls of the traction pin apertures as slide stops.

Accordingly, objects of the present invention include the provision of a mechanically simple and economically fabricated pipe connector comprising an apertured coupling sleeve incorporating fluid sealing elements, sphincteral bands, and comprising traction pins supported by the sphincteral bands for inward pipe engaging extension and for outwardly pipe releasing retraction.

Other and further objects, benefits, and advantages of the present invention will become known to those skilled in the art upon review of the Detailed Description which follows, and upon review of the appended drawings.

DETAILED DESCRIPTION OF A PREFERRED EMBODIMENT

Figure 1:
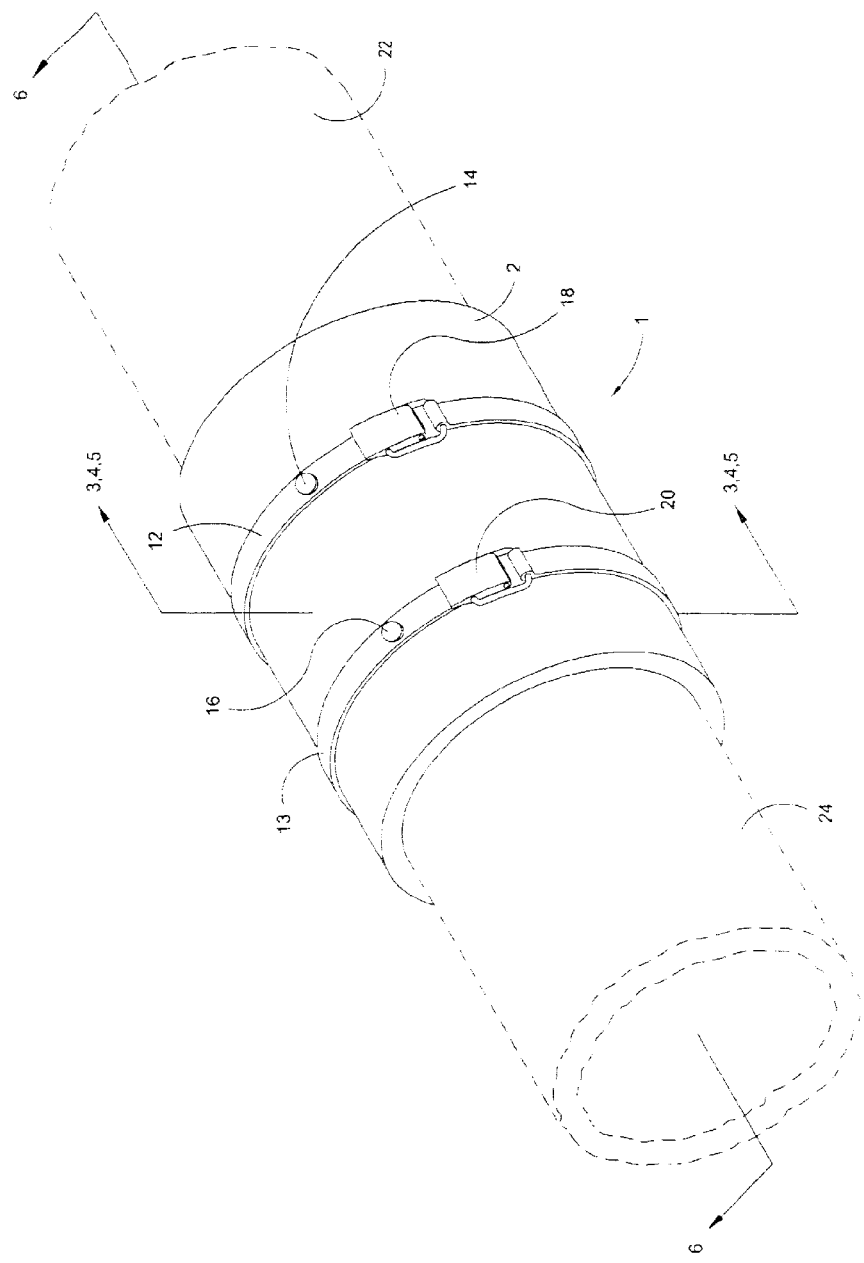
FIG. 1 is an isometric view of a preferred embodiment on in-line configuration of the instant inventive pipe connector.

Referring now to the drawings, and in particular to FIG. 1, the instant inventive pipe connector is referred to generally by Reference Arrow 1. The pipe connector 1 comprises a coupling sleeve 2, preferably comprising injection molded polyvinylchloride plastic, which functions as a quill for receiving pipes to be joined, e.g., pipes 22 and 24 shown in dashed lines. The opposing longitudinal openings of coupling sleeve 2, as depicted in FIG. 1, are angled with respect to each other at zero degrees for facilitating the depicted in-line pipe joint. Suitably, coupling sleeves configured similarly with coupling sleeve 2 may be elbowed (not drawn) so that their opposed openings are angularly oriented with each other for joining such pipes at various angles. Also suitably, such sleeves may be configured as "T" (not drawn) or "Y" (not drawn) connectors.

Figure 6:
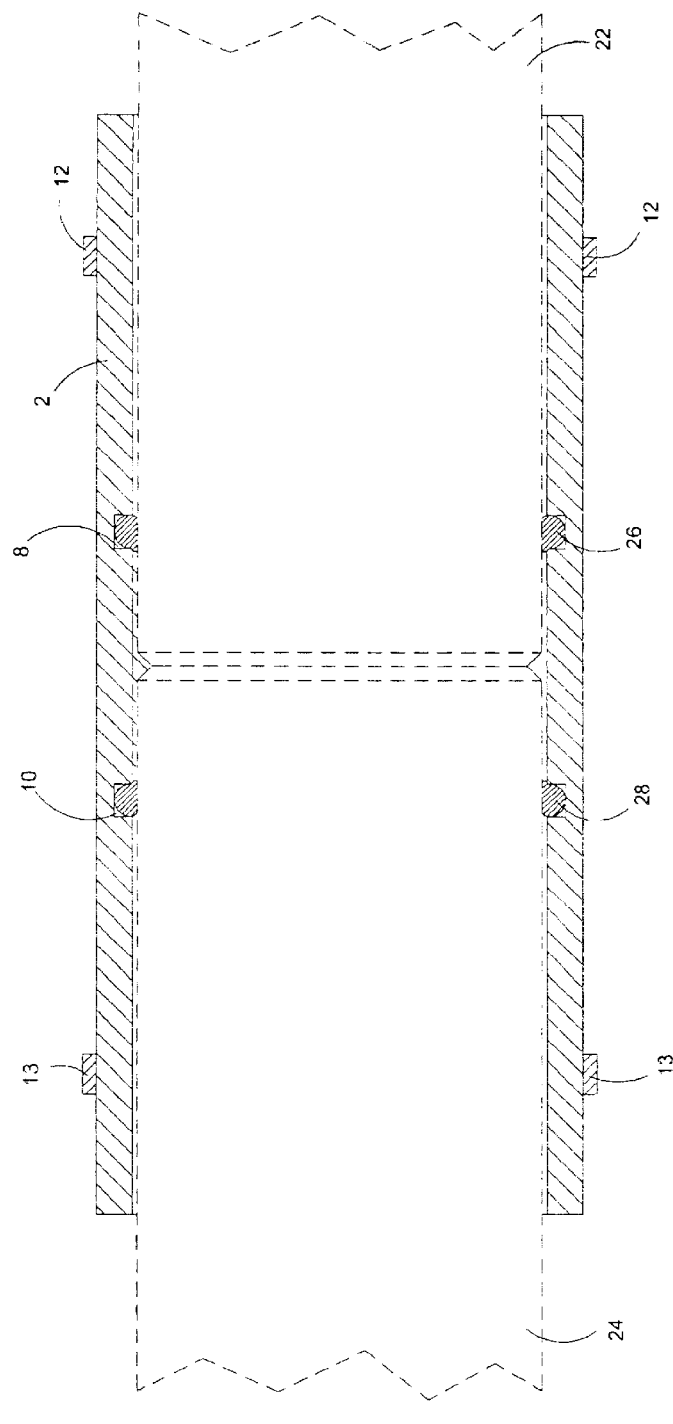
FIG. 6 is a second sectional view as indicated in FIG. 1.

Referring simultaneously to FIGS. 1 and 6, coupling sleeve 2 preferably includes internal annular channels 8 and 10 for receiving and retaining elastomeric "O" rings 26 and 28, the "O" rings 26 and 28 in combination with channels 8 and 10 providing fluid seals for preventing fluids carried by pipes 22 and 24 from emitting from the opposed longitudinal openings of coupling sleeve 2.

Referring simultaneously to FIGS. 2–5, the wall of coupling sleeve 2 which receives and retains pipe 22 preferably has three traction pin apertures 4 which are spaced evenly and annularly about coupling sleeve 2. Similarly, the longitudinally opposite wall of the coupling sleeve 2 which receives pipe 24 has three traction pin apertures 6 which are similarly spaced evenly and annularly about coupling sleeve 2.

Figure 2:
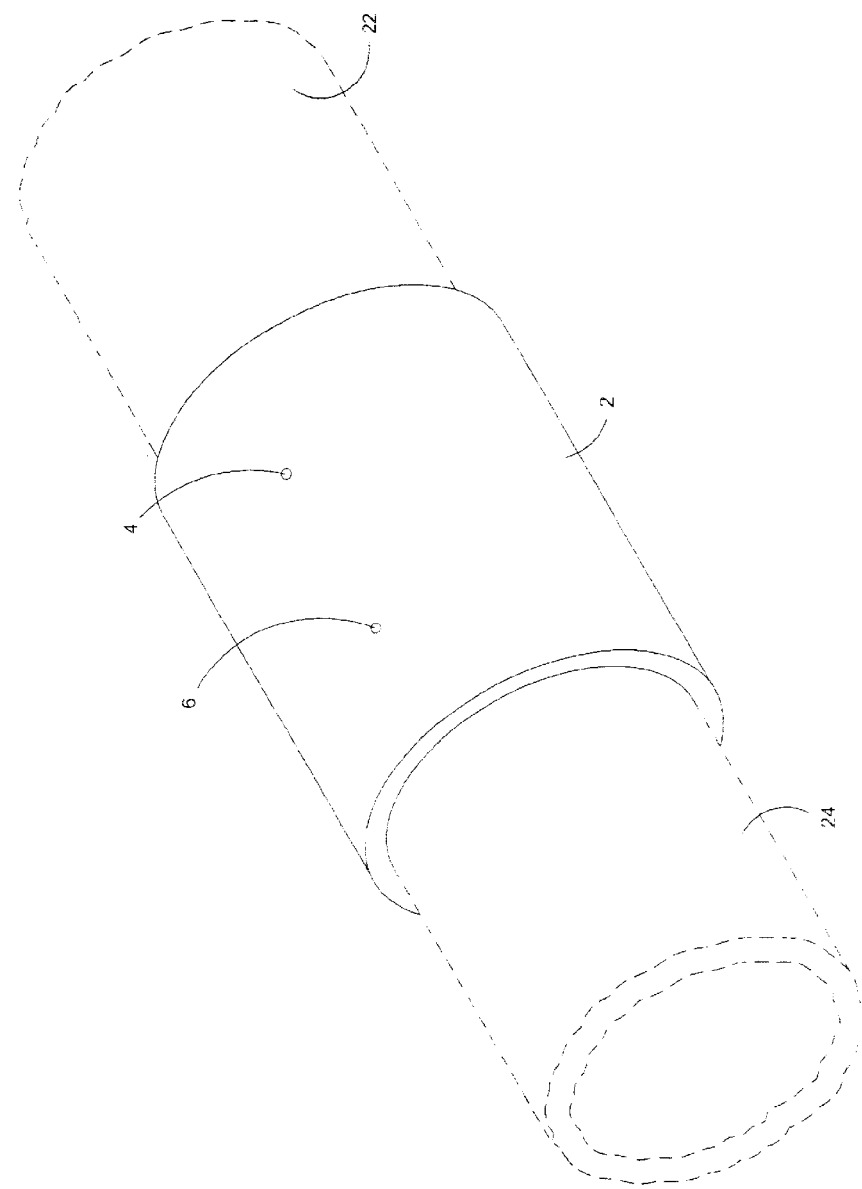
FIG. 2 redepicts FIG. 1, showing sphincteral bands 12 and 13 removed.

Referring simultaneously to FIGS. 2 and 6, the traction pin apertures 4 and 6 are preferably positioned between "O" rings 26 and 28, and the opposed longitudinally openings of coupling sleeve 2, such positioning of apertures 4 and 6 allowing the "O" rings 26 and 28 to prevent emission of fluids from apertures 4 and 6.

Figure 3:
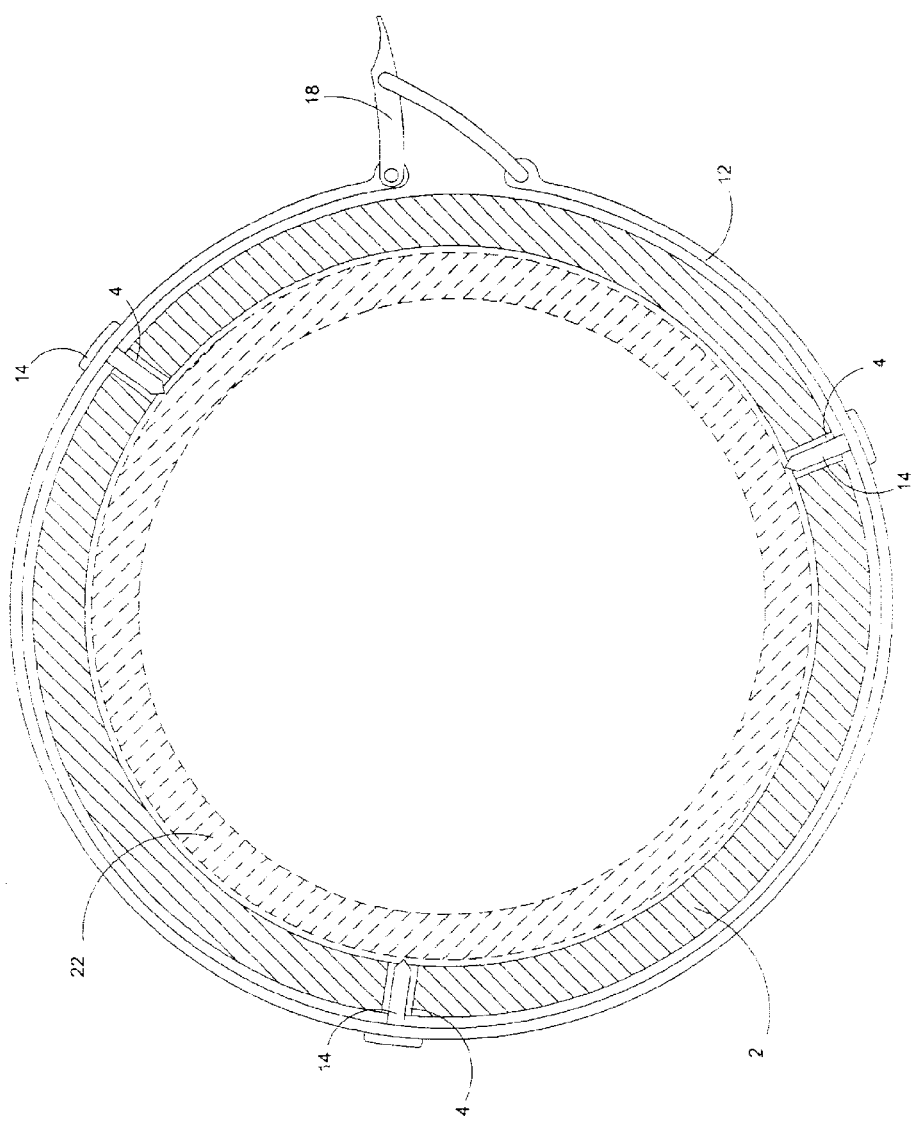
FIG. 3 is a sectional view from the perspective indicated in FIG. 1, the view showing over-center buckle 18 in an opened configuration.

Referring to FIG. 1, flexible spring steel sphincteral bands 12 and 13 extend annularly about coupling sleeve 2 and, referring further to FIG. 2, such bands 12 and 13 overlie traction pin apertures 4 and 6. Referring further simultaneously to FIG. 3, traction pins 14 inwardly cantilever and extend from sphincteral band 12 through traction pin apertures 4. Traction pins 16 similarly inwardly extend from sphincteral band 13 through traction pin apertures 6.

Figure 4:
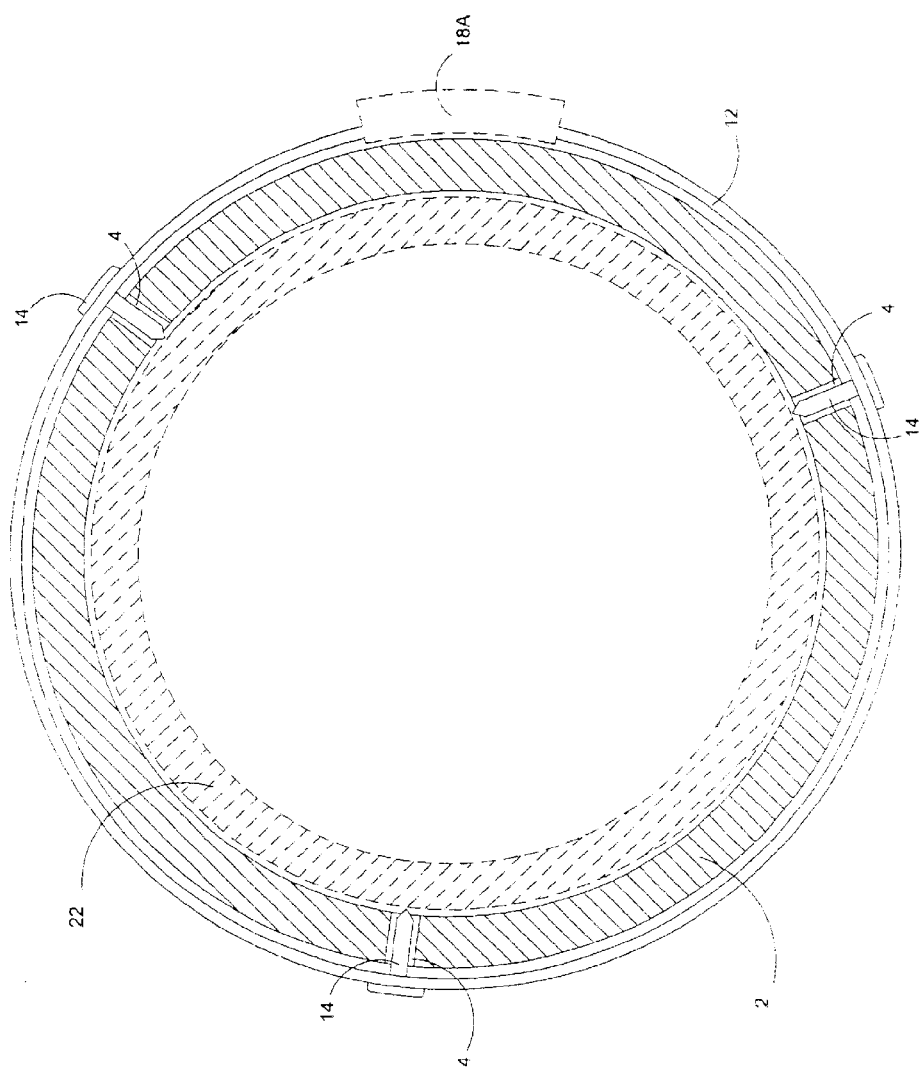
FIG. 4 redepicts FIG. 3 replacing over-center buckle 18 with representational band connecting element 18A.
Figure 5:
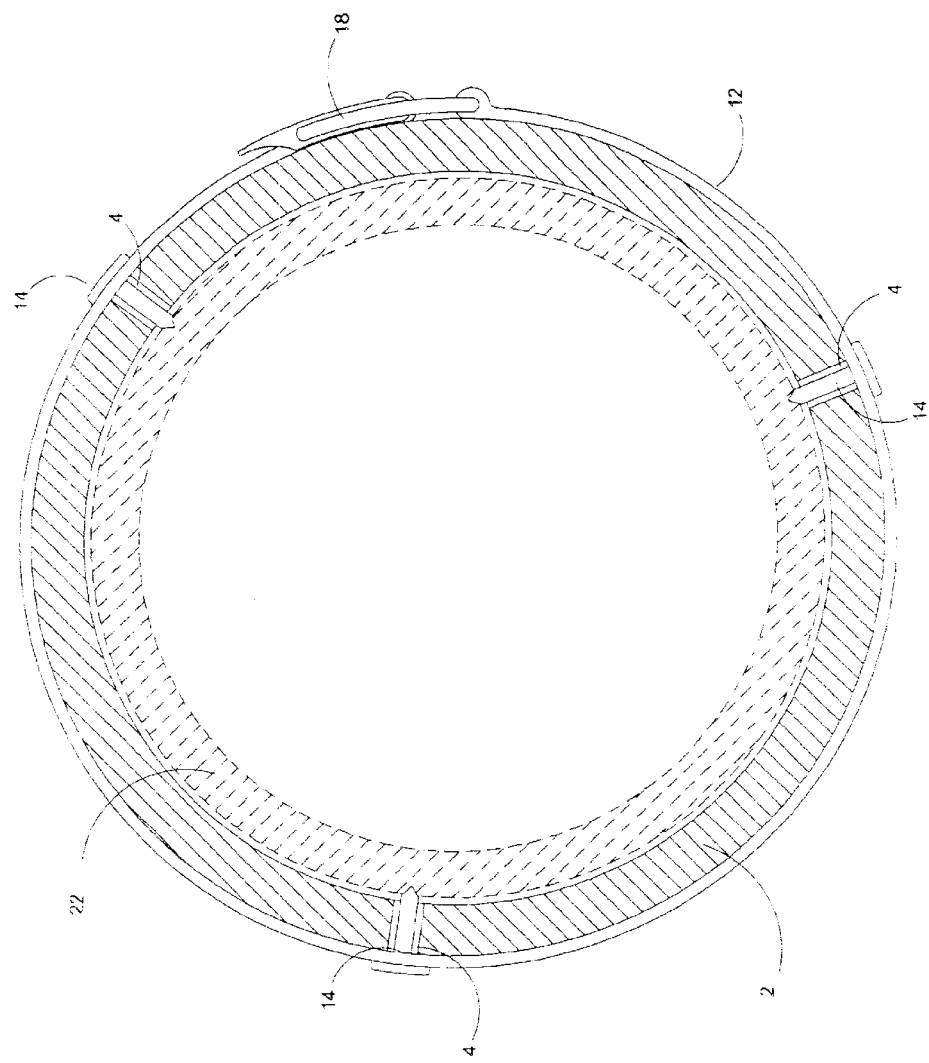
FIG. 5 is a sectional view as indicated in FIG. 1.

Referring to FIG. 3, over-center buckle 18 upon manual movement to its opened position, outwardly loosens sphincteral band 12, allowing traction pins 14 to remain outwardly retracted away from the outer surface of underlying pipe 22. Referring further simultaneously to FIG. 5, upon manual closure of over-center buckle 18, sphincteral band 12 is tightened about coupling sleeve 2, inwardly extending traction pins 14 through traction pin apertures 4, and driving the distal ends of traction pins 14 against the outer surface of underlying pipe 22. The distal ends of traction pins 14 depicted in FIGS. 3–5 are alternately representative of friction enhancing spike points, blade edges, and serrated teeth. Upon inward extension of traction pins 14, their distal ends dig into or scribe the surface of underlying pipe 22, securely holding underlying pipe 22 and resisting longitudinal movement of pipe 22 with respect to coupling sleeve 2. Referring simultaneously to FIGS. 1 and 2, upon closure of over-center buckle 20, traction pins 16 of sphincteral band 13 similarly extend inwardly through traction pin apertures 6 for secure engagement with underlying pipe 24. Upon dual closure of over-center buckles 18 and 20, traction pins 14 and 16 securely hold underlying pipes 22 and 24 in place as depicted while, referring further to FIG. 6, "O" rings 8 and 10 seal the pipe joint against fluid emission. Referring simultaneously to FIGS. 1, 3, and 5, upon manual opening of over-center buckles 18 and 20, bands 12 and 13 outwardly expand, outwardly retracting traction pins 14 and 16 and releasing pipes 22 and 24 for longitudinal pipe disconnecting movement.

Referring to FIG. 4, dashed line box 18A representationally replaces over-center buckle 18, such box indicating that numerous commonly known connectors which are capable of holding and tightening bands such as band 12 fall within the scope of the invention.

While the principles of the invention have been made clear in the above illustrative embodiment, those skilled in the art may make modifications in the structure, arrangement, portions and components of the invention without departing from those principles. Accordingly, it is intended that the description and drawings be interpreted as illustrative and not in the limiting sense, and that the invention be given a scope commensurate with the appended claims.

I claim:

1. A pipe connector comprising:
   (a) a continuous sphincteral band;
   (b) a pipe coupling sleeve having an annular wall extending through the sphincteral band, the pipe coupling sleeve having at least a first traction pin aperture extending through the annular wall; and
   (c) at least a first traction pin fixedly attached to the sphincteral band and extending inwardly therefrom, the at least first traction pin-extending through the at least first traction pin aperture, the at least first traction pin being moveable between an inwardly extended pipe engaging position and an outwardly retracted pipe disengaging position.

2. A pipe connector comprising:
   (a) a sphincteral band;
   (b) a coupling sleeve having an annular wall extending through the sphincteral band, the coupling sleeve having at least a first traction pin aperture extending through the annular wall; and
   (c) at least a first traction pin fixedly attached to the sphincteral band and extending inwardly therefrom, the at least first traction pin extending through the at least first traction pin aperture, the at least first traction pin being moveable between an inwardly extended pipe engaging position and an outwardly retracted pipe disengaging position; the sphincteral band comprising an end connector selected from the group consisting of over-center buckles, worm gear buckles, flexible pawl buckles, double eye turn back buckles, roll back fasteners, bandit band fasteners, cable tie fasteners and pre-formed clamp fasteners.

3. The pipe connector of claim 2 further comprising at least a second traction pin aperture wherein the traction pin apertures are arranged annularly around the coupling sleeve's annular wall.

4. The pipe connector of claim 3 wherein each traction pin has a distal end adapted for frictional pipe engagement.

5. The pipe connector of claim 4 wherein the adaptations for frictional pipe engagement comprise configurations selected from the group consisting of spike points, blade edges, and serrated teeth.

6. The pipe connector of claim 5 wherein the coupling sleeve's annular wall has an annular inner surface, and further comprising pipe sealing means connected operably to the annular inner surface.

7. The pipe connector of claim 6 wherein the pipe sealing means comprises an "O" ring nestingly received within a channel within the annular inner surface of the coupling sleeve's annular wall.

8. The pipe connector of claim 7 wherein the sphincteral band and the traction pins comprise steel, and wherein the coupling sleeve comprises a material selected from the group consisting of plastic, steel, brass, and copper.

9. A pipe connector comprising:
   (a) first and second continuous sphincteral bands;
   (b) a pipe coupling sleeve having first and second annular walls respectively extending through the first and second sphincteral bands, the first and second annular walls having first and second pluralities of traction pin apertures respectively extending therethrough; and;
   (c) first and second pluralities of traction pins respectively attached to the first and second sphincteral bands and respectively extending inwardly therefrom, each first traction pin extending through one of the first traction pin apertures, and each second traction pin extending through one of the second traction pin apertures, the first and second traction pins being moveable between inwardly extended pipe engaging positions and outwardly retracted pipe disengaging positions.

10. A pipe connector comprising:
    (a) first and second sphincteral bands;
    (b) a coupling sleeve having first and second annular walls respectively extending through the first and second sphincteral bands, the first and second annular walls having first and second pluralities of traction pin apertures respectively extending therethrough; and,
    (c) first and second pluralities of traction pins respectively attached to the first and second sphincteral bands and respectively extending inwardly therefrom each first traction pin extending through one of the first traction pin apertures, and each second traction pin extending through one of the second traction pin apertures, the first and second traction pins being moveable between inwardly extended pipe engaging positions and outwardly retracted pipe disengaging positions;
    the coupling sleeve's second annular wall being oriented at an angle with respect to the coupling sleeve's first annular wall.

11. The pipe connector of claim 10 wherein the first and second sphincteral bands comprise end connectors selected from the group consisting of over-center buckles, worm gear buckles, flexible pawl buckles, double eye turn back buckles, roll back fasteners, bandit band fasteners, cable tie fasteners, and pre-formed clamp fasteners.

12. The pipe connector of claim 11 wherein the first and second traction pin apertures are respectively arranged annularly around the coupling sleeve's first and second annular walls.

13. The pipe connector of claim 12 wherein each first traction pin and each second traction pin has a distal end adapted for frictional pipe engagement.

14. The pipe connector of claim 13 wherein the adaptations for frictional pipe engagement comprise configurations selected from the group consisting of spike points, blade edges and serrated teeth.

15. The pipe connector of claim 14 wherein the coupling sleeve's first and second walls respectively have first and second annular inner surfaces, and further comprising first and second pipe sealing means respectively connected operably to the first and second annular inner surfaces.

16. The pipe connector of claim 15 wherein the first and second pipe sealing means comprise first and second "O" rings respectively nestingly received within channels within the annular inner surfaces of the coupling sleeve's walls.

17. The pipe connector of claim 16 wherein the first and second sphincteral bands and the first and second traction pins comprise steel, and wherein the coupling sleeve comprises a material selected from the group consisting of plastic, copper, steel, and brass.

* * * * *